United States Patent
Hsu

(10) Patent No.: US 9,720,432 B2
(45) Date of Patent: Aug. 1, 2017

(54) POWER TRANSMISSION APPARATUS WITH OVER-LOADING PROTECTION AND POWER-SAVING MECHANISM

(71) Applicant: ELIFECONNECTION CO., LTD., Taipei (TW)

(72) Inventor: Cheng-Tsuen Hsu, Taipei (TW)

(73) Assignee: ELIFECONNECTION CO., LTD., Taipei (TW)

( * ) Notice: Subject to any disclaimer, the term of this patent is extended or adjusted under 35 U.S.C. 154(b) by 337 days.

(21) Appl. No.: 14/640,024

(22) Filed: Mar. 6, 2015

(65) Prior Publication Data

US 2015/0253796 A1   Sep. 10, 2015

(30) Foreign Application Priority Data

Mar. 7, 2014   (TW) .............................. 103107984 A
Feb. 13, 2015   (TW) .............................. 104105018 A

(51) Int. Cl.
*H02H 3/20*   (2006.01)
*H02H 3/24*   (2006.01)
(Continued)

(52) U.S. Cl.
CPC ............... *G05F 1/66* (2013.01); *G05B 15/02* (2013.01); *H02J 9/005* (2013.01)

(58) Field of Classification Search
CPC .................................. G05F 1/66; H02H 3/20
(Continued)

(56) References Cited

U.S. PATENT DOCUMENTS 8,405,254 B2 *   3/2013   Kitano ................... H02J 9/005
                                        307/116
8,493,755 B2 *   7/2013   Terlizzi .................. H02M 1/36
                                        323/284
(Continued)

FOREIGN PATENT DOCUMENTS

CN         101316039         12/2008
CN         203455685          2/2014
(Continued)

OTHER PUBLICATIONS

"Office Action of Japan Counterpart Application," issued on Mar. 15, 2016, p. 1-p. 7.
(Continued)

*Primary Examiner* — Thienvu Tran
*Assistant Examiner* — Lucy Thomas
(74) *Attorney, Agent, or Firm* — Jianq Chyun IP Office

(57) ABSTRACT

A power transmission apparatus with over-loading protection and power-saving mechanism is provided. The power transmission apparatus includes a switch module and a control module. The switch module includes a first switch circuit, a second switch circuit and a protection circuit. The first switch circuit is coupled between a power input module and a power supply port. The second switch circuit is coupled to the power input module. The protection circuit is coupled between the second switch circuit and the power supply port and detects a load power of the power supply port when the second switch circuit is turned-on. When the load power is greater than a predetermined over-loading threshold, the protection circuit enables the first switch circuit. After the control module determines that the first switch circuit is enabled, the control module controls the first switch circuit keeps enabling and disables the second switch circuit and the protection circuit.

11 Claims, 7 Drawing Sheets

(51) Int. Cl.
*G05F 1/66* (2006.01)
*H02J 9/00* (2006.01)
*G05B 15/02* (2006.01)

(58) Field of Classification Search
USPC .......................................................... 361/90
See application file for complete search history.

(56) References Cited

U.S. PATENT DOCUMENTS

| | | | |
|---|---|---|---|
| 2004/0057179 A1* | 3/2004 | Galang | H02H 3/207 |
| | | | 361/90 |
| 2011/0063759 A1 | 3/2011 | Billingsley et al. | |
| 2011/0095608 A1* | 4/2011 | Jonsson | G01D 4/002 |
| | | | 307/39 |
| 2011/0185194 A1 | 7/2011 | Lin et al. | |

FOREIGN PATENT DOCUMENTS

| | | |
|---|---|---|
| DE | 29924935 | 11/2006 |
| JP | H02193520 | 7/1990 |
| JP | H1023672 | 1/1998 |
| JP | 2006050697 | 2/2006 |
| JP | 2013128343 | 6/2013 |
| WO | 2011068322 | 6/2011 |

OTHER PUBLICATIONS

"Search Report of European Counterpart Application", issued on Aug. 10, 2015, p. 1-p. 4.
"Office Action of China Counterpart Application," issued on May 25, 2017, p. 1-p. 6.

* cited by examiner

001 # POWER TRANSMISSION APPARATUS WITH OVER-LOADING PROTECTION AND POWER-SAVING MECHANISM

CROSS-REFERENCE TO RELATED APPLICATION

This application claims the priority benefits of Taiwan application serial no. 103107984, filed on Mar. 7, 2014 and Taiwan application serial no. 104105018, filed on Feb. 13, 2015. The entirety of each of the above-mentioned patent applications is hereby incorporated by reference herein and made a part of this specification.

BACKGROUND OF THE INVENTION

Field of the Invention

The invention relates to a power transmission technique, and more particularly, to a power transmission apparatus with over-loading protection and power-saving mechanism.

Description of Related Art

In modern life, as usage of electric appliances becoming even more popular, people's demand on electric appliances also increases each day. An extension cord is often purchased in order to satisfy more of appliances in many households and working places, and some people might even choose a smart extension cord for its added values of power-saving and electrical safety. The smart extension cord usually includes a smart switch. The smart switch can be automatically turned off or controlled to switch between on/off states when excessive power consumption or over-loading occurs.

With current technology, an actuating element of the smart switch is basically composed of relays. Common relays include an electromagnetic relay (EMR) and a solid state relay (SSR). Among them, the electromagnetic relay is capable of bearing greater current and suffering less impact from temperature variation on the electromagnetic relay. Power consumed while driving the electromagnetic relay is different based on different rated current values but is mostly of a fixed value. For example, power consumed while driving the electromagnetic relay with an AC operating voltage of 250 VAC and the rated current value of 15 A is approximately 0.5 W. However, in the case of light-loading, power consumed by the electromagnetic relay is higher in comparison with the solid state relay. Also, even in a standby mode (i.e., zero load), the electromagnetic relay will continuously consume power. On the other hand, power consumed by the solid state relay is proportional to a load current. Therefore, during the standby mode (i.e., zero load, where the load current is approximately 0A) or when the load current is less than 0.5 A (i.e., light-loading), the solid state relay can provide a characteristic of zero power consumption or less power consumption for effectively reducing power consumption and a faster switching speed. Therefore, in some low power consumption (power-saving) applications, the solid state relay may be used to replace the electromagnetic relay (example 1), or the solid state relay may be used together with the electromagnetic relay (example 2). However, although the solid state relay has the characteristic of low power consumption and the faster switching speed, in the application of example 2 where the solid state relay is used together with the electromagnetic relay to realize the smart switch, if appropriate protection measures are not available, once over-loading suddenly occurs when the solid state relay is turned on, instantaneous high current from city power is likely to cause damage to the solid state relay.

Accordingly, it is one of important issues to be solved by persons skilled in the art as how to prevent the solid state relay from damages due to sudden increases in load power consumption during a power-saving mode (i.e., when the solid state relay is turned on) of the extension cord when a switch apparatus of the extension cord adopts example 2 (i.e., the solid state relay is used together with the electromagnetic relay) to achieve optimal application of both high power and power-saving.

SUMMARY OF THE INVENTION

The invention is directed to a power transmission apparatus with over-loading protection and power-saving mechanism for solving the problems as mentioned in Description of Related Art.

The power transmission apparatus of the invention includes a switch module. The switch module includes a first switch circuit, a second switch circuit and a protection circuit. The first switch circuit is coupled between the power input module and the power supply port to receive an AC power provided by a city power system from the power input module. The first switch circuit is controlled by the first control signal to transmit the AC power to the power supply port. The second switch circuit is coupled to the power input module to receive the AC power. The protection circuit is coupled between the second switch circuit and the power supply port. The second switch circuit is controlled by a second control signal to transmit the AC power to the power supply port through the protection circuit. The protection circuit is controlled by the second control signal to detect a load power of the power supply port when the second switch circuit is turned on. The protection circuit generates the first control signal to enable the first switch circuit when an instantaneous variation of the load power is greater than a predetermined over-loading threshold so as to protect the second switch circuit at an on-state.

In an embodiment of the invention, the power transmission apparatus further includes a control module. The control module is coupled to the first switch circuit, the second switch circuit, and the protection circuit to control on/off states of the first switch circuit, the second switch circuit, and the protection circuit and receive the first control signal. When the control module determines that the first switch circuit is turned on according to the first control signal, the control module controls the first switch circuit to be kept at the on-state, and the control module generates the second control signal to disable the second switch circuit and the protection circuit.

In an embodiment of the invention, the power transmission apparatus further includes a detection module. The detection module is coupled between another terminal of the power input module and another terminal of the power supply port to detect the load power of the power supply port. The control module is coupled to the detection module to receive the load power. The control module controls the on/off states of the first switch circuit, the second switch circuit, and the protection circuit according to the load power detected by the detection module.

In an embodiment of the invention, when the first switch circuit is turned on, the second switch circuit is not turned on, and the load power detected by the detection module is continuously less than a power-saving threshold for a predetermined time, the control module enables the second switch circuit and the protection circuit and disables the first switch circuit. The power-saving threshold is less than the predetermined over-loading threshold.

In an embodiment of the invention, when the second switch circuit is turned on, the first switch circuit is not turned on, and the load power detected by the detection module is continuously greater than the power-saving threshold and less than the predetermined over-loading threshold for a predetermined time, the control module enables the first switch circuit and disables the second switch circuit and the protection circuit.

In an embodiment of the invention, the protection circuit includes a sensing circuit and an over-loading protection circuit. The sensing circuit is coupled between the second switch circuit and the power supply port to detect the load power of the power supply port, and generates a trigger signal. The over-loading protection circuit is coupled to the sensing circuit to receive the trigger signal, and generates the first control signal in response to the trigger signal when the second switch circuit is turned on.

In an embodiment of the invention, the sensing circuit includes a resistor and an optical coupler. The resistor is coupled between the second switch circuit and the power supply port. The optical coupler is coupled to two terminals of the resistor, and generates the trigger signal in response to a voltage difference between the two terminals of the resistor.

In an embodiment of the invention, the over-loading protection circuit includes an NAND gate, a D flip-flop and a transistor. A first input terminal of the NAND gate is coupled to the sensing circuit to receive the trigger signal. A reset terminal of the D flip-flop is coupled to the control module to receive the second control signal. An inverted data output terminal of the D flip-flop is coupled to a data input terminal of the D flip-flop and coupled to a second input terminal of the NAND gate. A clock input terminal of the D flip-flop is coupled to an output terminal of the NAND gate. A control terminal of the transistor is coupled to a non-inverted data output terminal of the D flip-flop. A first terminal of the transistor is coupled to a ground terminal. A second terminal of the transistor is configured to output the first control signal.

In an embodiment of the invention, the over-loading protection circuit includes a processor and a transistor. The processor is coupled to the sensing circuit to receive the trigger signal. The processor is coupled to the control module to receive the second control signal, and accordingly generates a switch signal. A control terminal of the transistor is coupled to the processor to receive the switch signal. A first terminal of the transistor is coupled to a ground terminal. A second terminal of the transistor is configured to output the first control signal. The processor controls an on/off state of the transistor in response to the trigger signal when the processor determines that the second switch circuit is turned on according to the second control signal. When the processor determines that the second switch circuit is not turned on according to the second control signal, the processor turns off the transistor.

In an embodiment of the invention, the over-loading protection circuit includes a one-shot circuit. The one-shot circuit is coupled to the sensing circuit to receive the trigger signal. The one-shot circuit is coupled to the control module to receive the second control signal. The one-shot circuit generates a pulse in response to the second control signal and the trigger signal, and outputs the pulse to serve as the first control signal. Herein, a time interval started when the protection circuit enables the first switch circuit until the control module determines that the first switch circuit is turned on is a determination delay time, and a width of the pulse generated by the one-shot circuit is greater than the determination delay time.

In an embodiment of the invention, the first switch circuit includes an electromagnetic relay, and the second switch circuit includes a solid state relay.

Based on the above, the power transmission apparatus according to the invention is capable of detecting the load power of the power supply port, and switching between the first switch circuit and the second switch circuit in the switch module according to the detected load power. When the protection circuit detects that the load power is greater than the predetermined over-loading threshold, the protection circuit may generate the first control signal to turn on the first switch circuit to reduce the current that flow through the second switch circuit so as to perform the over-loading protection for the second switch circuit. After the control module determines that the first switch circuit is turned on by the protection circuit according to the first control signal, the control module may control the first switch circuit to be kept at the on-state and generate the second control signal to disable the second switch circuit and the protection circuit. As a result, the risk for damaging the second switch circuit due to over-loading may be significantly reduced.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
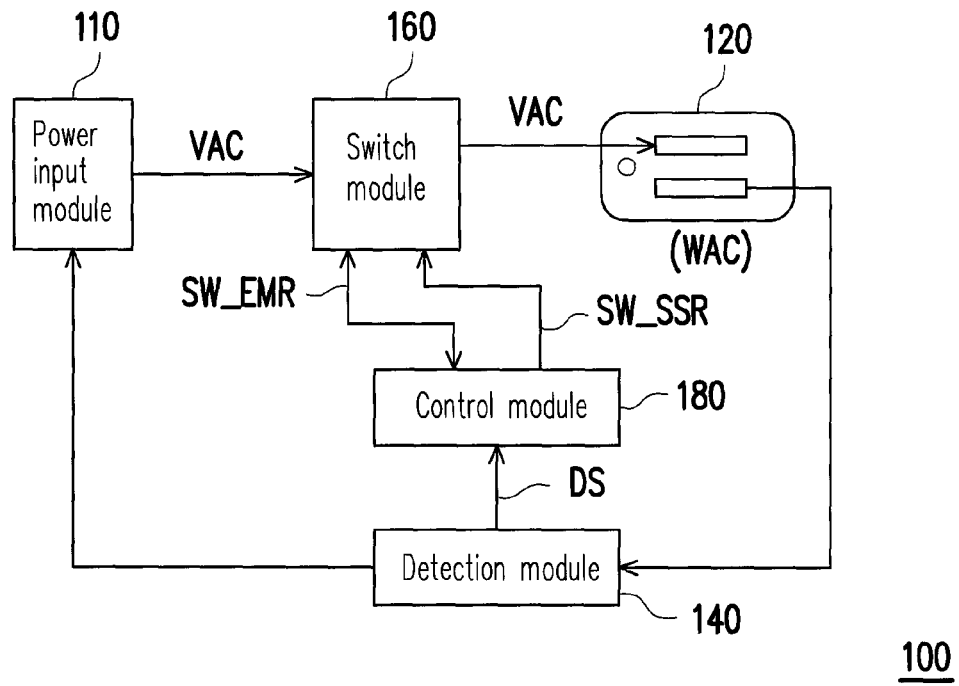
FIG. 1 is a block diagram illustrating a power transmission apparatus with over-loading protection and power-saving mechanism according to an embodiment of the invention.

In order to make content of the present disclosure more comprehensible, embodiments are described below as the examples to prove that the present disclosure can actually be realized. Moreover, elements/components/steps with same reference numerals represent same or similar parts in the drawings and embodiments.

Hereinafter, referring to FIG. 1, FIG. 1 is a block diagram illustrating a power transmission apparatus 100 with overloading protection and power-saving mechanism according to an embodiment of the invention. As illustrated in the drawing, the power transmission apparatus 100 may be, for example, a power extension cord. The power transmission apparatus 100 may include a power input module 110, a power supply port 120, a detection module 140, a switch module 160, and a control module 180.

The power input module 110 may be a plug of the power transmission apparatus 100 (e.g., a plug of the power extension cord). The power input module 110 may be coupled to a city power system (not illustrated) to receive an AC power VAC and provide the AC power VAC to the switch module 160 in the power transmission apparatus 100.

The switch module 160 is coupled between one terminal of the power input module 110 and one terminal of the power supply port 120. The switch module 160 receives the AC power VAC from the power input module 110 and is controlled by a first control signal SW_EMR and a second control signal SW_SSR to transmit the AC power VAC to the power supply port 120.

The power supply port 120 may be a socket of the power transmission apparatus 100 (e.g., a socket of the power extension cord). The power transmission apparatus 100 is capable of providing the AC power VAC to external AC appliance devices (e.g., appliances including a computer, a television, a hair dryer, a heating pot, a refrigerator, etc.) through the power supply port 120.

The detection module 140 is coupled between another terminal of the power input module 110 and another terminal of the power supply port 120 to detect a load state of the power supply port 120 and accordingly generate a detection signal DS. For instance, when a user inserts a plug of an appliance into the power supply port 120, the detection module 140 may detect a load requirement of the power supply port 120 and detect a power required by said appliance. The detection module 140 may obtain a load power of the appliance according to a detection result and accordingly provide the detection signal DS to the control module 180. Herein, the load power may include a voltage value, a current value and an electrical power value, but the invention is not limited thereto. In an embodiment of the invention, the detection module 140 may be realized by using a current sensor, but the invention is not limited thereto.

The control module 180 is coupled to the detection module 140 to receive the detection signal DS. The control module 180 generates the first control signal SW_EMR and the second control signal SW_SSR according to the load power indicated in the detection signal DS. The control module 180 may switch a state of the switch module 160 according to the first control signal SW_EMR and the second control signal SW_SSR. In an embodiment of the invention, the control module 180 may be realized by using a micro-processor, an application specific integrated circuit (ASIC) or a field programmable gate array (FPGA). Hereinafter, detail regarding an internal structure of the switch module 160 and a collaborative operation of the switch module 160 and the control module 180 is described as follows.

Figure 2:
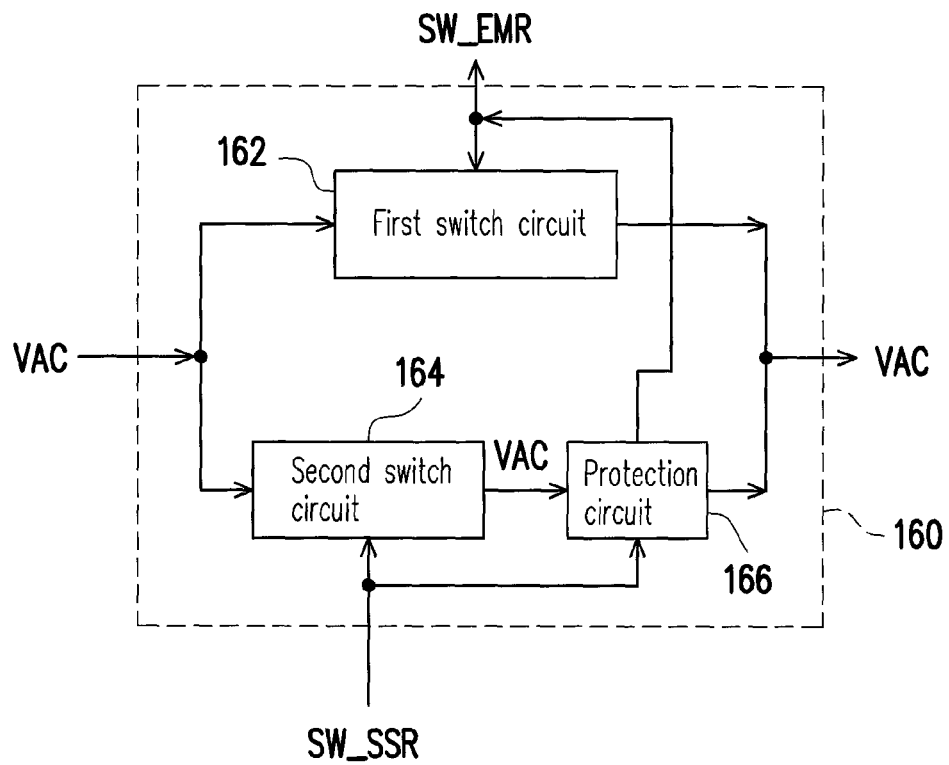
FIG. 2 is a block diagram illustrating circuitry of the switch module of the power transmission apparatus of FIG. 1.

Referring to FIG. 1 and FIG. 2 together, where FIG. 2 is a block diagram illustrating circuitry of the switch module 160 of the power transmission apparatus 100 of FIG. 1. The switch module 160 includes a first switch circuit 162, a second switch circuit 164, and a protection circuit 166. In an embodiment of the invention, the first switch circuit 162 may include an electromagnetic relay, and the second switch circuit 164 may includes a solid state relay, but the invention is not limited thereto. In other embodiments of the invention, the first switch circuit 162 may be, for example, a switch circuit capable of bearing greater current and suffering less influence from temperature variation, and the second switch circuit 164 may be, for example, a switch circuit with low power consumption and faster switching speed.

The first switch circuit 162 is coupled between the power input module 110 and the power supply port 120 to receive the AC power VAC from the power input module 110. The first switch circuit 162 is controlled by the first control signal SW_EMR to transmit the AC power VAC to the power supply port 120. Herein, the first control signal SW_EMR may be generated by the control module 180 or the protection circuit 166. In other words, the first switch circuit 162 may be controlled by the control module 180 or controlled by the protection circuit 166. Whether the first switch circuit 162 is controlled by the control module 180 or the protection circuit 166 is depended upon the load state of the power supply port 120. Detail regarding the above will be described later.

The second switch circuit 164 is coupled to the power input module 110 to receive the AC power VAC. The protection circuit 166 is coupled between the second switch circuit 164 and the power supply port 120. As shown in FIG. 2, the second switch circuit 164 is connected to the protection circuit 166 in series, and the second switch circuit 164 and the protection circuit 166 are connected to the first switch circuit 162 in parallel. Herein, the second switch circuit 164 is controlled by the second control signal SW_SSR to transmit the AC power VAC to the power supply port 120 through the protection circuit 166. The protection circuit 166 is controlled by the second control signal SW_SSR to detect a load power of the power supply port 120 when the second switch circuit 164 is turned on. Herein, the second control signal SW_SSR is generated by the control module 180. In other words, the control module 180 may simultaneously control on/off states of the second switch circuit 164 and the protection circuit 166 according to the second control signal SW_SSR.

It should be understood that, the switch module 160 has two power transmission channels, where one of the power transmission channels receives the AC power VAC from the power input module 110 by the first switch circuit 162 and transmits the AC power VAC to the power supply port 120. Another one of the power transmission channels receives the AC power VAC from the power input module 110 and transmits the AC power VAC to the power supply port 120 by the second switch circuit 164 and the protection circuit 166. In other words, an on-state of the switch module 160 may be changed by controlling whether to turn on the first switch circuit 162 and the second switch circuit 164 or not.

Besides, the protection circuit 166 may generate the first control signal SW_EMR to enable the first switch circuit 162 according to the detected load power, so as to protect the second switch circuit 164. Accordingly, the large current from the city power system may be prevented from damaging the second switch circuit 164 when the power supply port 120 is over-loading. Herein, the load power detected by the protection circuit 166 may include a voltage value, a current value and an electrical power value.

On the other hand, the control module 180 may generate the first control signal SW_EMR and the second control signal SW_SSR according to the load power indicated in the detection signal DS. The control module 180 is capable of controlling switch of an on/off state for each of the first switch circuit 162 and the second switch circuit 164 by the first control signal SW_EMR and the second control signal SW_SSR, such that the switch module 160 is capable switching between a high power mode and a low power mode to achieve the effectiveness in switching between higher performance or lower power consumption.

Figure 3:
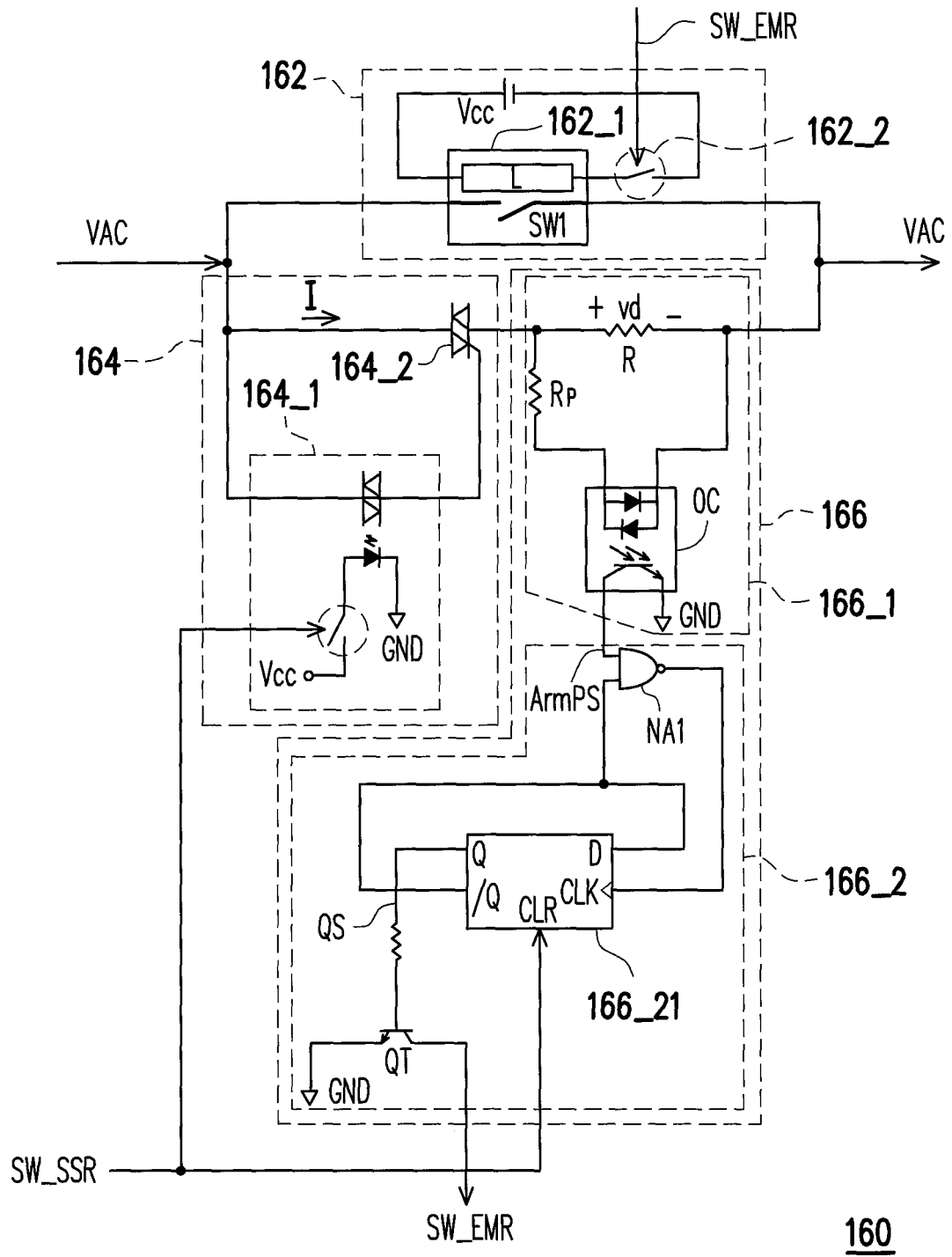
FIG. 3 is a schematic diagram illustrating a circuit scheme of the switch module of the power transmission apparatus of FIG. 1.

Hereinafter, referring to FIG. 1 to FIG. 3 together, where FIG. 3 is a schematic diagram illustrating a circuit scheme of the switch module 160 of the power transmission apparatus 100 of FIG. 1. In the embodiment depicted in FIG. 3, the first switch circuit 162 includes an electromagnetic relay 162_1 and a switch 162_2. The electromagnetic relay 162_1 has an activated state and a bouncing state.

When the control module 180 or the protection circuit 166 enables the first switch circuit 162 by turning on the switch 162_2, the electromagnetic relay 162_1 can enter the bouncing state to be turned on only after waiting for a Relay ON-delay time. Therefore, during the Relay ON-delay time, the electromagnetic relay 162_1 stays in the activated state, and enters the bouncing state after the Relay ON-delay time is ended. The electromagnetic relay 162_1 can enter a stable on-state only after a Relay ON Contact Bouncing time is ended. In other words, the first switch circuit 162 can enter the stable on-state only after the Relay ON Contact Bouncing time of the electromagnetic relay 162_1 is ended.

In addition, when the control module 180 or the protection circuit 166 disables the electromagnetic relay 162_1 by turning off the switch 162_2, the electromagnetic relay 162_1 can be turned off only after waiting for a Relay OFF-delay time. Naturally, lengths of the Relay ON-delay time, the Relay ON Contact Bouncing time and the Relay OFF-delay time are different based on the different electromagnetic relays. Therefore, the control module 180 may pre-store the Relay ON-delay time, the Relay ON Contact Bouncing time and the Relay OFF-delay time of the electromagnetic relay 162_1 in the system, so that the control module 180 can calculate for time-points when the electromagnetic relay 162_1 is really turned on or not turned on.

In the embodiment depicted in FIG. 3, the second switch circuit 164 includes an optical coupler 164_1 operated under a DC operating voltage Vcc and a tri-electrode AC switch (TRIAC) 164_2, but the invention is not limited thereto. When the control module 180 enables the optical coupler 164_1 by the second control signal SW_SSR, the tri-electrode AC switch 164_2 may be turned on at the same time when the optical coupler 164_1 is enabled. In fact, the second switch circuit 164 may essentially be regarded as a solid state relay. The solid state relay has a characteristic of fast reaction speed, and may be turned on and turned off rapidly.

In the embodiment depicted in FIG. 3, the protection circuit 166 includes a sensing circuit 166_1 and an over-loading protection circuit 166_2. The sensing circuit 166_1 is coupled between the second switch circuit 164 and the power supply port 120 to detect the load power of the power supply port 120, and generates a trigger signal ArmPS. The over-loading protection circuit 166_2 is coupled to the sensing circuit 166_1 to receive the trigger signal ArmPS, and controlled by the second control signal SW_SSR to generate the first control signal SW_EMR in response to the trigger signal ArmPS when the second switch circuit 164 is turned on.

Generally, when the switch 162_2 in the first switch circuit 162 is turned on, current that flow through a coil L in the electromagnetic relay 162_1 generates an electromagnetic effect to attract a contact electrode switch SW1 in the electromagnetic relay 162_1, so as to turn on the first switch circuit 162. At this time, a power consumption (e.g., 0.5 W, but the invention is not limited thereto) is generated on the coil L in the electromagnetic relay 162_1.

On the other hand, when the tri-electrode AC switch 164_2 in the second switch circuit 164 is turned on with current flowing through, a voltage drop is generated between two main electrodes of the tri-electrode AC switch 164_2. In other words, when there is an electricity demand from a load (e.g., the appliance) on the power supply port 120, a current I from the city power system will flow through the tri-electrode AC switch 164_2 and generate the voltage drop between the two main electrodes of the tri-electrode AC switch 164_2, such that the power consumption is generated on the tri-electrode AC switch 164_2. The current I that flow through the tri-electrode AC switch 164_2 is increased when the electricity demand from the load on the power supply port 120 increases, such that the power consumption of the tri-electrode AC switch 164_2 will rise. As a result, a temperature of the tri-electrode AC switch 164_2 is also increased.

Because the tri-electrode AC switch 164_2 is very sensitive to temperature variation, the second switch circuit 164 cannot stably provide a high-power electrical output. Besides, when the current I that flow through the tri-electrode AC switch 164_2 become greater, the power consumption on the tri-electrode AC switch 164_2 is increased accordingly. Therefore, in an embodiment of the invention, when the power consumption on the tri-electrode AC switch 164_2 of the second switch circuit 164 is greater than the power consumption on the coil L of the electromagnetic relay 162_1 of the first switch circuit 162, the power transmission channel of the power transmission apparatus 100 may be switched from the second switch circuit 164 to the first switch circuit 162 for power-saving. However, the invention is not limited thereto. A condition for switching the power transmission channel of the power transmission apparatus 100 may be decided based on practical applications or design requirements.

For instance, it is assumed that a voltage of the AC power VAC supplied by the power supply port 120 is 110V; when the first switch circuit 162 is turned on, the power consumption generated on the coil L in the electromagnetic relay 162_1 is 0.5 W; and when the tri-electrode AC switch 164_2 in the second switch circuit 164 is turned on, the voltage drop between the two main electrodes of the tri-electrode AC switch 164_2 is 1.2V, and the power consumption generated when the current flows pass the protection circuit 166 may be disregarded. Under this circumstance, when the current I is less than 0.417 A (i.e., 0.5 W divided by 1.2V), the power consumption generated when the second switch circuit 164 is turned on will be less than the power consumption generated when the first switch circuit 162 is turned on. In other words, when the load power of the power supply port 120 is less than 46 W (i.e., 0.417 A multiplied by 110V), the power consumption generated by the second switch circuit 164 served as the power transmission channel of power transmission apparatus 100 is lower.

Figure 4:
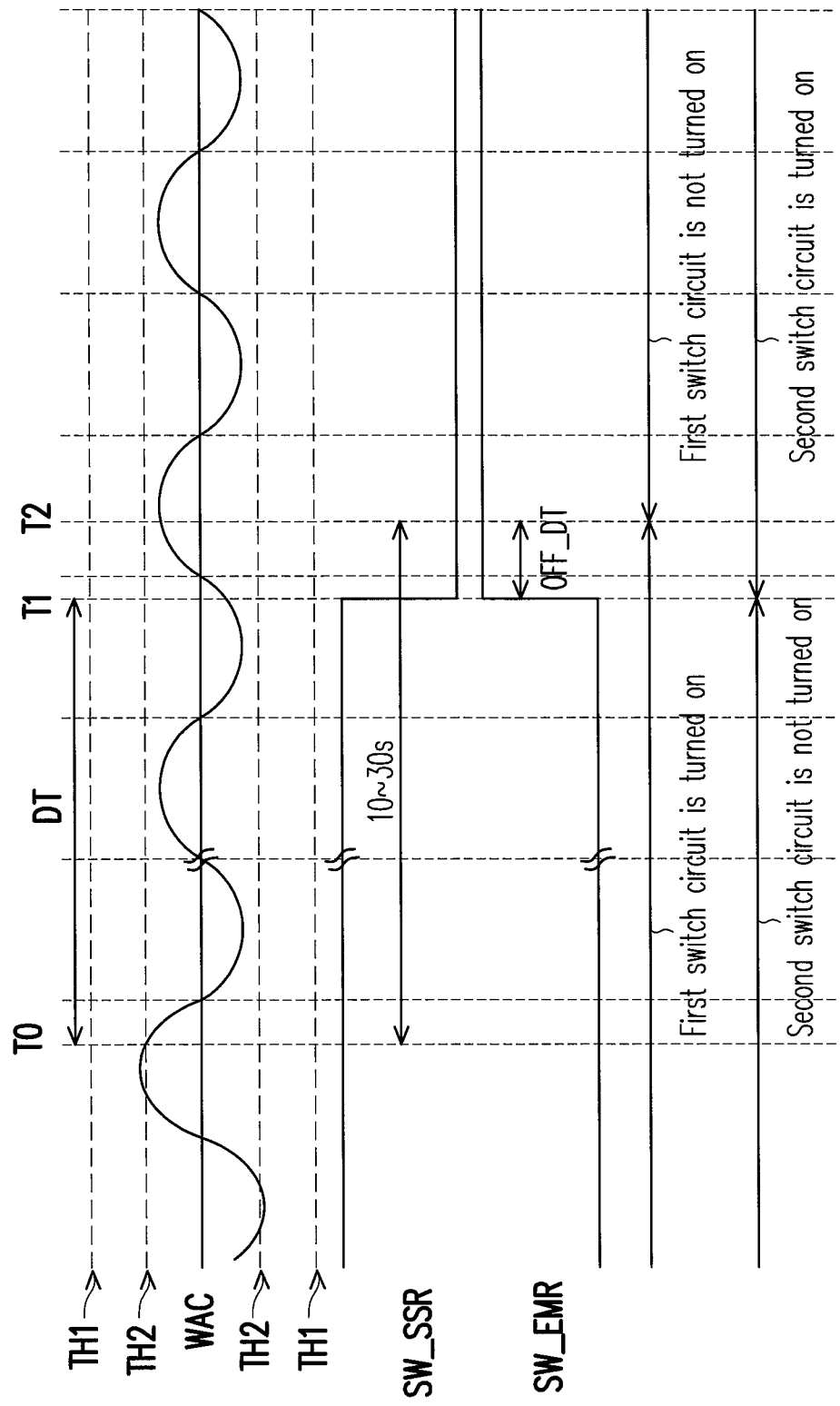
FIG. 4 is a schematic diagram illustrating a timing sequence of the power transmission apparatus of FIG. 1.

Hereinafter, referring to FIG. 1 to FIG. 4 together, where FIG. 4 is a schematic diagram illustrating a timing sequence of the power transmission apparatus 100 of FIG. 1. As shown in FIG. 4, at a time T0, the first switch circuit 162 is turned on, the second switch circuit 164 is not turned on, and a load power WAC of the power supply port 120 detected by the detection module 140 starts to be less than a power-saving threshold TH2 (e.g., 46 W of the foregoing example).

At a time T1, because the load power WAC of the power supply port 120 detected by the detection module 140 is continuously less than the power-saving threshold TH2 (e.g., 46 W of the foregoing example) for a predetermined time DT, the control module 180 may enable the second switch circuit 164 and the protection circuit 166 and disable the first switch circuit 162 so that the power transmission apparatus 100 operates in the low power consumption mode.

Herein, it is worth mentioning that, the second switch circuit 164 and the protection circuit 166 are turned on at the time T1, and yet, the first switch circuit 162 can turn off the electromagnetic relay 162_1 only after waiting for a Relay OFF-delay time OFF DT. Therefore, in between the times T1 and T2, the first switch circuit 162 and the second switch circuit 164 are both at the on-state, but the invention is not limited thereto. In other embodiments of the invention, the control module 180 may enable the second switch circuit 164 and the protection circuit 166 between the times T1 and T2 (i.e., before the Relay OFF-delay time OFF DT is ended). Besides, in an embodiment of the invention, a time interval between the times T0 to T2 is 10 to 30 seconds, but the invention is not limited thereto. In other words, a time started when the control module 180 determines that the load power WAC starts to be less than the power-saving threshold TH2 until the control module 180 completes a switching operation for the switch module 160 is 10 to 30 seconds, but the invention is not limited thereto.

In contrast, in the foregoing example, when the current I is greater than 0.417 A, the power consumption generated by the second switch circuit 164 will be greater than that of the first switch circuit 162. In other words, when the load power of the power supply port 120 is greater than 46 W, the power consumption generated by the first switch circuit 162 served as the power transmission channel of power transmission apparatus 100 is relatively lower.

Figure 5:
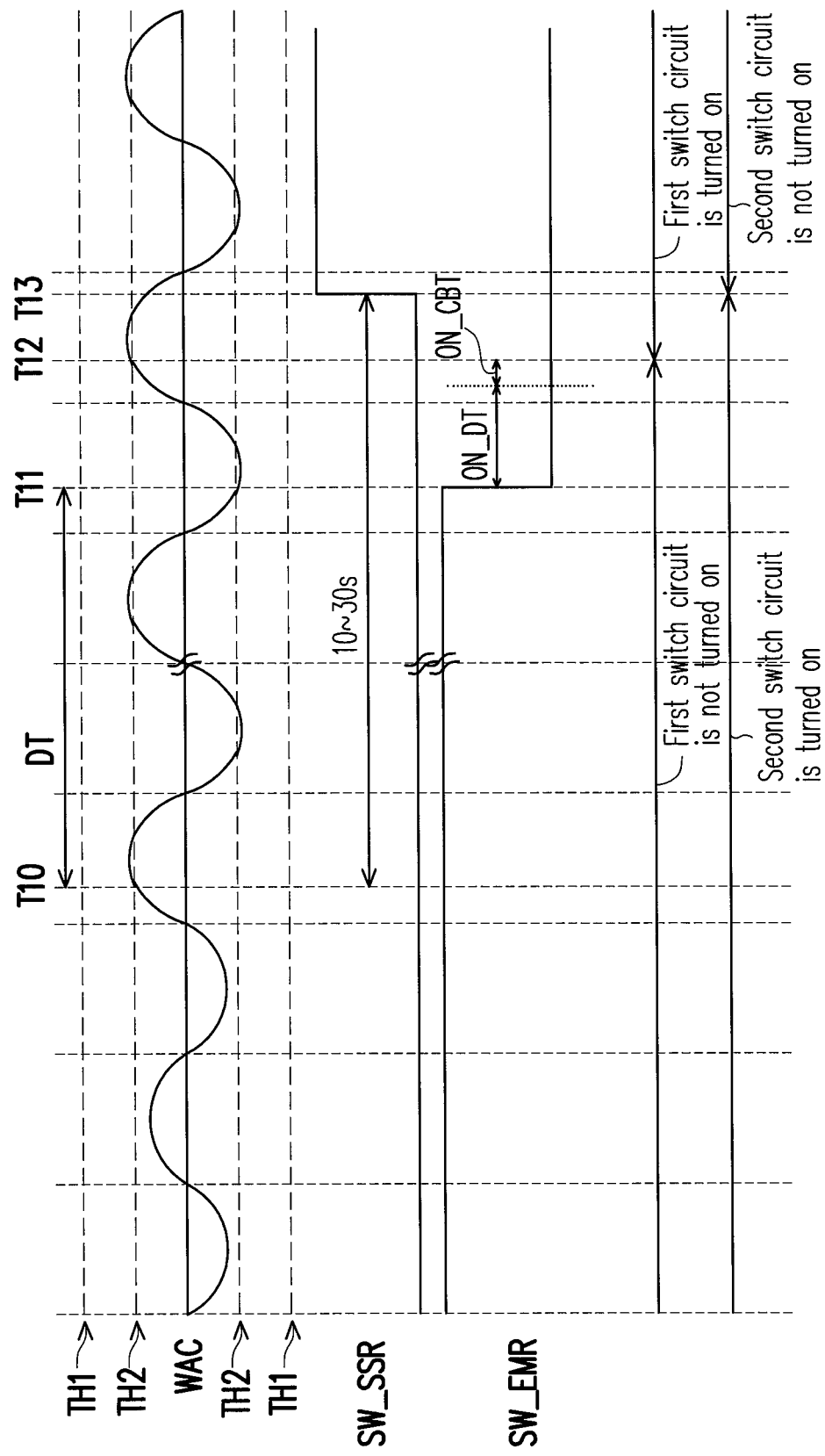
FIG. 5 is a schematic diagram illustrating another timing sequence of the power transmission apparatus of FIG. 1.

Hereinafter, referring to FIG. 1 to FIG. 3 and FIG. 5 together, where FIG. 5 is a schematic diagram illustrating another timing sequence of the power transmission apparatus 100 of FIG. 1. As shown in FIG. 5, at a time T10, the first switch circuit 162 is not turned on, the second switch circuit 164 is turned on, and a load power WAC of the power supply port 120 detected by the detection module 140 starts to be greater than the power-saving threshold TH2 (e.g., 46 W of the foregoing example) but less than a predetermined over-loading threshold TH1. At a time T11, because the load power WAC of the power supply port 120 detected by the control module 180 through the detection module 140 is continuously greater than the power-saving threshold TH2 (e.g., 46 W of the foregoing example) but less than the predetermined over-loading threshold TH1 for the predetermined time DT, the control module 180 may enable the first switch circuit 162 and disable the second switch circuit 164 and the protection circuit 166 so that the power transmission apparatus 100 operates in the high-power mode.

Herein, it is worth mentioning that, although the first switch circuit 162 receives the first control signal SW_EMR in an enabled state (e.g., a logic low level) at the time T11, the electromagnetic relay 162_1 can enter the stable on-state only after waiting for a Relay ON-delay time ON_DT and a Relay ON Contact Bouncing time ON_CBT (i.e., after a time T12). Therefore, the control module 180 may disable the second switch circuit 164 and the protection circuit 166 by the second control signal SW_SSR after the time T12, such as a time T13 depicted in FIG. 5. Therefore, in between the times T12 and T13, the first switch circuit 162 and the second switch circuit 164 are both at the on-state, but the invention is not limited thereto. Besides, in an embodiment of the invention, a time interval between the times T10 to T13 is 10 to 30 seconds. In other words, a time started when the control module 180 determines that the load power WAC is greater than the power-saving threshold TH2 until the control module 180 completes a switching operation for the switch module 160 is 10 to 30 seconds, but the invention is not limited thereto.

It should be noted that, the above embodiments serve to illustrate rather than limit the scope of the invention. Accordingly, a selection of the power-saving threshold may be decided based on practical applications or design requirements.

Generally, once the user has finished using the appliance, usually, the user only removes the plug of the appliance from the power supply port 120 (e.g., the socket of the power extension cord) of the power transmission apparatus 100 (e.g., the power extension cord) without further removing the power input module 110 (e.g., the plug of the power extension cord) of the power transmission apparatus 100 from the socket of the city power system. Accordingly, the power transmission apparatus 100 will continue to receive the AC power VAC from the city power system to be provided to the power supply port 120. At this time, because the power supply port 120 is not connected to the appliance (i.e., the load), the load power WAC of the power supply port 120 detected by the detection module 140 is 0 W. After the detection module 180 determines that the load power WAC of the power supply port 120 is continuously less than the power-saving threshold TH2 (e.g., 46 W of the foregoing example) for the predetermined time DT, the control module 180 may enable the second switch circuit 164 and the protection circuit 166 and disable the first switch circuit 162 so that the power transmission apparatus 100 operates in the low power consumption mode.

Under this circumstance, if the user suddenly plugs a high-power appliance (e.g., a refrigerator, a roaster or a hair dryer which is not switched off) into the power supply port 120, a large current will flow from the city power system, via the power input module 110 and the switch module 160, to the appliance coupled to the power supply port 120. Because the power transmission apparatus 110 operates in the low power consumption mode at the time (i.e., the second switch circuit 164 is turned on while the first switch circuit 162 is not turned on), if said large current exceeds a rated current value of the tri-electrode AC switch 164_2 of the second switch circuit 164 (i.e., the second switch circuit 164 is over-loading), it is most likely that the tri-electrode AC switch 164_2 will be damaged. Besides, when the second switch circuit 164 is over-loading, usually, the control module 180 is unable to complete the switching operation for the switch module 160 within a short period of time (e.g., in milliseconds). Accordingly, the risk for damaging the tri-electrode AC switch 164_2 will be greatly increased. In order to avoid aforesaid situation, the protection circuit 166 as depicted in FIG. 1 to FIG. 3 may be used to perform an over-loading protection for the second switch circuit 164.

More specifically, herein, it is assumed that a rated current of the tri-electrode AC switch 164_2 in the second switch circuit 164 is 4 A and the AC power VAC received and supplied by the power transmission apparatus 100 is 110V. Accordingly, when the protection circuit 166 detects that the load power WAC of the power supply port 120 is greater than 440 W (i.e., 4 A multiplied by 110V), the protection circuit 166 may instantly generate the first control signal SW_EMR to turn on the first switch circuit 162.

Because the second switch circuit 164 is connected to the first switch circuit 162 in parallel and the first switch circuit 162 is capable of bearing greater current, the first switch circuit 162 may provide an effect of bypassing over-loading current for the second switch circuit 164 when the second switch circuit 164 is over-loading (e.g., as shown by a time T21 in FIG. 6, where the load power WAC is greater than the predetermined over-loading threshold TH1), so as to perform the over-loading protection for the second switch circuit 164. In this example, the predetermined over-loading threshold TH1 being 440 W serves to illustrate rather than limit the scope of the invention. In fact, a selection of the predetermined over-loading threshold TH1 may be decided based on practical applications and the design requirements, and the power-saving threshold TH2 is usually less than the predetermined over-loading threshold TH1.

Besides, the protection circuit 166 may also inform the control module 180 by the first control signal SW_EMR. After the control module 180 determines that the first switch circuit 162 is turned on by the protection circuit 166 according to the first control signal SW_EMR, the control module 180 may generate the second control signal SW_SSR to disable the second switch circuit 164 and the protection circuit 166 and control the first switch circuit 162 to be kept at the on-state.

Hereinafter, detail regarding the protection circuit 166 is described as follows. Referring back to FIGS. 1 to 3 together. As shown in FIG. 3, the protection circuit 166 includes the sensing circuit 166_1 and the over-loading protection circuit 166_2. The sensing circuit 166_1 may include a resistor R and an optical coupler OC. The resistor R is coupled between the second switch circuit 164 and the power supply port 120. When the current I flows through the resistor R, a voltage difference vd may be generated between two terminals of the resistor R. The optical coupler OC is coupled to the two terminals of the resistor R, and generates the trigger signal ArmPS in response to the voltage difference vd between the two terminals of the resistor R. Specifically, when the voltage difference vd between the two terminals of the resistor R is greater than a turn-on voltage value of the optical coupler OC, the optical coupler OC may be turned on to accordingly generate the trigger signal ArmPS. As shown in FIG. 3, an input terminal of the optical coupler OC may be coupled to one terminal of the resistor R by a current-limiting resistor $R_P$, but the invention is not limited thereto. In other embodiments of the invention, the optical coupler OC may also be replaced by using other isolated switches.

The over-loading protection circuit 166_2 includes an NAND gate NA1, a D flip-flop 166_21 and a transistor QT. A first input terminal of the NAND gate NA1 is coupled to the sensing circuit 166_1 to receive the trigger signal ArmPS. A reset terminal CLR of the D flip-flop 166_21 is coupled to the control module 180 to receive the second control signal SW_SSR. An inverted data output terminal /Q of the D flip-flop 166_21 is coupled to a data input terminal D and coupled to a second input terminal of the NAND gate NA1. A clock input terminal CLK of the D flip-flop 166_21 is coupled to an output terminal of the NAND gate NA1. A control terminal of the transistor QT is coupled to a non-inverted data output terminal Q of the D flip-flop 166_21. A first terminal of the transistor QT is coupled to a ground terminal GND. A second terminal of the transistor QT is configured to output the first control signal SW_EMR. Herein, the transistor QT may be realized by using a bipolar junction transistor (BJT), but the invention is not limited thereto. In other embodiments of the invention, the transistor QT may also be realized by using a metal oxide semiconductor field effect transistor (MOSFET).

For instance, it is assumed herein that the rated current of the tri-electrode AC switch 164_2 in the second switch circuit 164 is an AC current of 4 A, the resistor R is of 0.2 ohm, and the turn-on voltage value of the optical coupler OC is 1V. When the second switch circuit 164 is overs-loading, that is, when an AC current I of 4 A flows to the power supply port 120 via the tri-electrode AC switch 164_2 and the resistor R, the AC current I of 4 A will generate an AC voltage difference vd of 0.8V between the two terminals of the resistor R. Since an instantaneous peak of the AC voltage difference of 0.8V is equivalent to 1.13V (i.e., 0.8V multiplied by 1.414), which is greater than the turn-on voltage value of the optical coupler OC being 1V, the optical coupler OC may then be turned on to accordingly generate the trigger signal ArmPS. In view of the above, it can be understood that, the sensing circuit 166_1 may detect whether the load power WAC of the power supply port 120 is greater than the predetermined over-loading threshold TH1 (e.g., 440 W) by detecting a current value of the current I, so as to generate the trigger signal ArmPS accordingly.

When the load power WAC of the power supply port 120 is greater than the predetermined over-loading threshold TH1, the trigger signal ArmPS generated by the sensing circuit 166_1 is capable of driving the D flip-flop 166_21. Then, the D flip-flop 166_21 will output a switch signal QS to enable the transistor QT, so as to output the first control signal SW_EMR to the control module 180 and the first switch circuit 162. Accordingly, the protection circuit 166 may rapidly enable the first switch circuit 162, and inform the control module 180 that the first switch circuit 162 is enabled. However, in order to ensure that the first switch circuit 162 is indeed entered the stable on-state before disabling the second switch circuit 164 and the protection circuit 166, the control module 180 may disable the second switch circuit 164 and the protection circuit 166 only after waiting for the Relay ON-delay time ON_DT and the Relay ON Contact Bouncing time ON_CBT.

Figure 6:
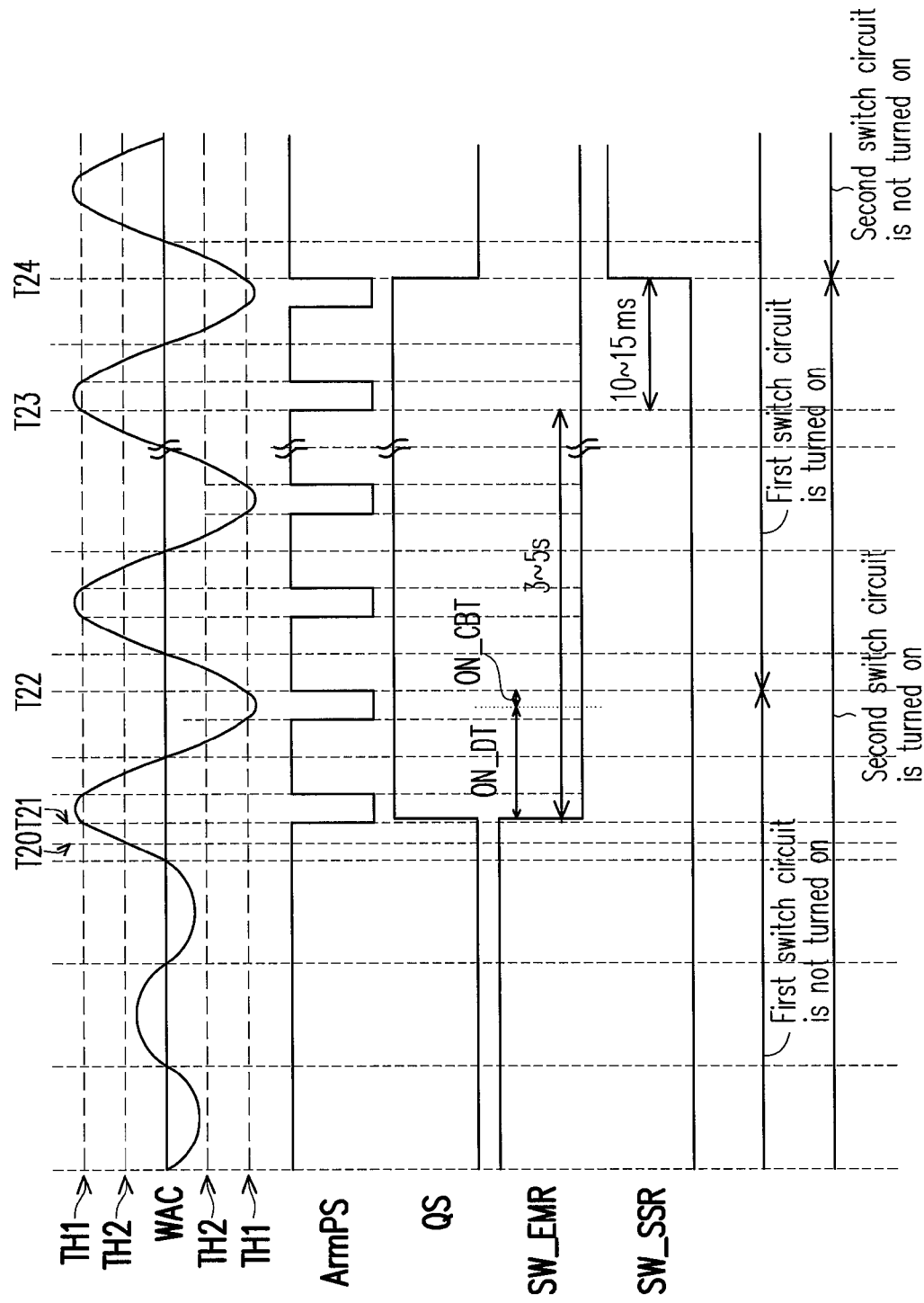
FIG. 6 is a schematic diagram illustrating yet another timing sequence of the power transmission apparatus of FIG. 1.

Hereinafter, referring to FIG. 1 to FIG. 3 and FIG. 6 together, where FIG. 6 is a schematic diagram illustrating yet another timing sequence of the power transmission apparatus 100 of FIG. 1. As shown in FIG. 6, before the time T20, the first switch circuit 162 is not turned on, the second switch circuit 164 is turned on, and the control module 180 determines that the load power WAC of the power supply port 120 is less than the power-saving threshold TH2 by the detection module 140. At the time T20, because the detection module 140 detects that the load power WAC of the power supply port 120 starts to be greater than the power-saving threshold TH2 (e.g., 46 W of the foregoing example), the control module 180 starts to switch the switch module 160.

At a time T21, the switching for the switch module 160 is not yet completed by the control module 180. However, at the same time, the sensing circuit 166_1 of the protection circuit 166 has detected that the load power WAC of the power supply port 120 starts to be greater than the over-loading threshold TH1 (e.g., 440 W of the foregoing example). Accordingly, the sensing circuit 166_1 generates the trigger signal ArmPS (e.g., converting from a logic high level to the logic low level) in response to the load power WAC being greater than the predetermined over-loading threshold TH1 at the time T21. The NAND gate NA1 in the over-loading protection circuit 166_2 triggers the D flip-flop 166_21 in response to a first-time state change of the trigger signal ArmPS, so as to change a state of the switch signal QS outputted by the non-inverted data output terminal Q of the D flip-flop 166_21 (e.g, converting from the logic low level to the logic high level). Accordingly, the transistor QT is turned on to enable the first control signal SW_EMR (e.g., converting from the logic high level to the logic low level). Herein, it is worth mentioning that, the circuit scheme of the NAND gate NA1 and the D flip-flop 166_21 in the over-loading circuit 166_2 can only respond to the first-time state change of the trigger signal ArmPS to avoid subsequent state changes of the trigger signal ArmPS from affecting the over-loading protection circuit 166_2 until the protection circuit 166 is disabled and then enabled again by the control module 180.

Although the first switch circuit 162 receives the first control signal SW_EMR in the enabled state (e.g., the logic low level) at the time T21, the electromagnetic relay 162_1 can enter the stable on-state only after waiting for a Relay ON-delay time ON_DT and a Relay ON Contact Bouncing time ON_CBT (i.e., after a time T22). In an embodiment of the invention, a sum of the Relay ON-delay time ON_DT and the Relay ON Contact Bouncing time ON_CBT of the electromagnetic relay 162_1 is 10 to 15 milliseconds (ms), but the invention is not limited thereto. Accordingly, a time interval started at the time T21 when the sensing circuit 166_1 of the protection circuit 166 detects that the load power WAC of the power supply port 120 starts to be greater than the predetermined over-loading threshold TH1 until the time T22 when the electromagnetic relay 162_1 of the first switch circuit 162 enters the stable on-state is 10 to 15 ms. In view of above, the protection circuit 166 is capable of rapidly turning on the first switch circuit 162 (in milliseconds) when the second switch circuit 164 is over-loading, so as to perform the over-loading protection for the second switch circuit 164.

More specifically, under the circumstance where the load power WAC of the power supply port 120 is greater than the predetermined over-loading threshold TH1, the time interval that only the second switch circuit 164 is turned on is merely 10 to 15 ms. As a result, the risk for damaging the second switch circuit 164 due to over-loading may be significantly reduced.

Subsequently, at a time T23, because the control module 180 determines that the first switch circuit 162 is turned on by the protection circuit 166 according to the first control signal SW_EMR, the control module 180 may control the first switch circuit 162 to be kept at the on-state (e.g., maintaining the first control signal SW_EMR at the logic low level). The control module 180 may generate the second control signal SW_SSR (e.g., converting from the logic low level to the logic high level) to disable the second switch circuit 164 and the protection circuit 166 only after waiting for the Relay ON-delay time ON_DT and the Relay ON Contact Bouncing time ON_CBT (i.e., at a time T24, but the invention is not limited thereto), so that the power transmission apparatus 100 operates in the high-power mode. In an embodiment of the invention, a time interval between the time T21 and the time T23 is 3 to 5 seconds, but the invention is not limited thereto.

Figure 7:
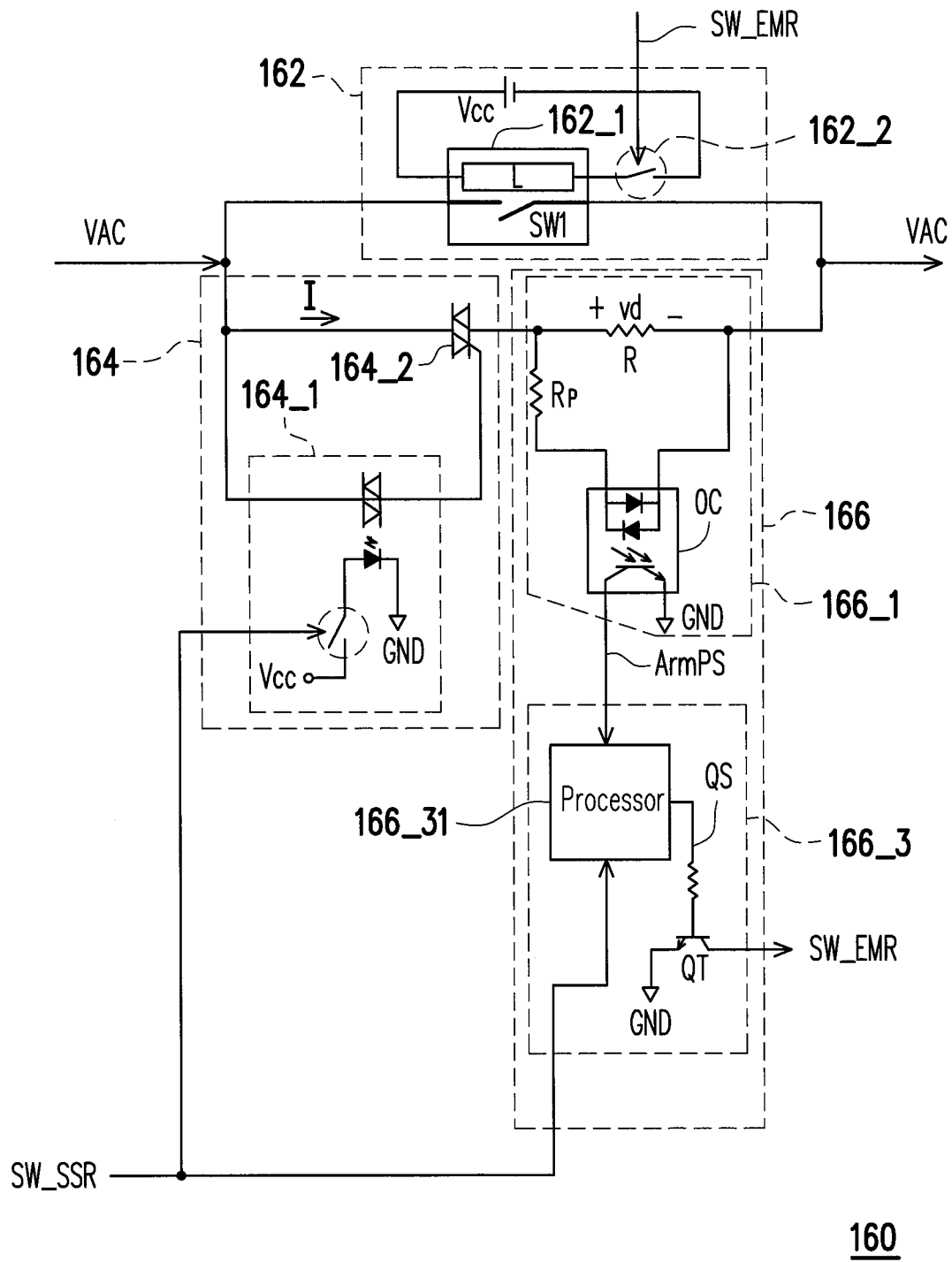
FIG. 7 is a schematic diagram illustrating another circuit scheme of the switch module of the power transmission apparatus of FIG. 1.

Hereinafter, referring to FIG. 1, FIG. 2 and FIG. 7 together, where FIG. 7 is a schematic diagram illustrating another circuit scheme of the switch module 160 of the power transmission apparatus 100 of FIG. 1. The first switch circuit 162, the second switch circuit 164, and the sensing circuit 166_1 of the protection circuit 166 in FIG. 7 are similar to those illustrated in FIG. 3. Therefore, operations of the first switch circuit 162, the second switch circuit 164, and the sensing circuit 166_1 of the protection circuit 166 in FIG. 7 may refer to the above related description, which is not repeated hereinafter.

Unlike the exemplary embodiment of FIG. 3, FIG. 7 illustrates a schematic diagram for implementation of an over-loading protection circuit 166_3 according to another exemplary embodiment of the invention. The over-loading protection circuit 166_3 includes a processor 166_31 and a transistor QT. The processor 166_31 is coupled to the sensing circuit 166_1 to receive the trigger signal ArmPS. The processor 166_31 is coupled to the control module 180 to receive the second control signal SW_SSR, and accordingly generates the switch signal QS. A control terminal of the transistor QT is coupled to the processor 166_31 to receive the switch signal QS. A first terminal of the transistor QT is coupled to a ground terminal GND. A second terminal of the transistor QT is configured to output the first control signal SW_EMR. When the processor 166_31 determines that the second switch circuit 164 is turned on according to the second control signal SW_SSR, the processor 166_31 controls an on/off state of the transistor QT in response to the trigger signal ArmPS. When the processor 166_31 determines that the second switch circuit 164 is not turned on according to the second control signal SW_SSR, the processor 166_31 turns off the transistor QT. An operation method of the processor 166_31 and the transistor QT is similar to the operating time sequence depicted in FIG. 6, such that the operating method may refer to related description for FIG. 6, which is not repeated hereinafter.

Figure 8:
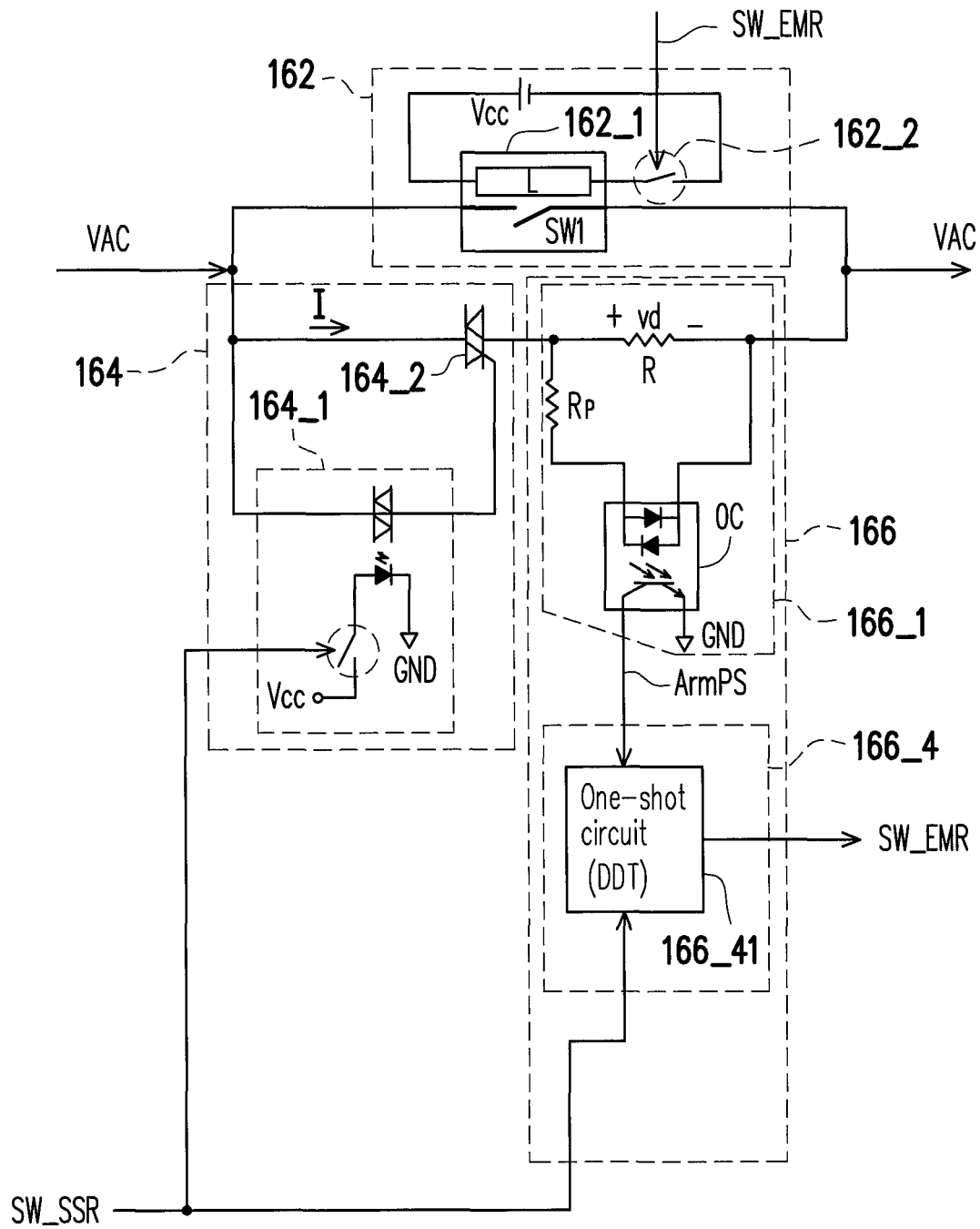
FIG. 8 is a schematic diagram illustrating yet another circuit scheme of the switch module of the power transmission apparatus of FIG. 1.

Hereinafter, referring to FIG. 1, FIG. 2 and FIG. 8 together, where FIG. 8 is a schematic diagram illustrating yet another circuit scheme of the switch module 160 of the power transmission apparatus 100 of FIG. 1. The first switch circuit 162, the second switch circuit 164, and the sensing circuit 166_1 of the protection circuit 166 in FIG. 8 are similar to those illustrated in FIG. 3. Therefore, operations of the first switch circuit 162, the second switch circuit 164, and the sensing circuit 166_1 of the protection circuit 166 in FIG. 8 may refer to the above related description, which is not repeated hereinafter.

Unlike the exemplary embodiment of FIG. 3, FIG. 8 illustrates a schematic diagram for implementation of an over-loading protection circuit 166_4 according to another exemplary embodiment of the invention. The over-loading protection circuit 166_4 includes a one-shot circuit 166_41. The one-shot circuit 166_41 is coupled to the sensing circuit 166_1 to receive the trigger signal ArmPS, and coupled to the control module 180 to receive the second control signal SW_SSR. The one-shot circuit 166_41 generates a pulse PLS in response to the second control signal SW_SSR and the trigger signal ArmPS, and outputs the pulse PLS to serve as the first control signal SW_EMR. Herein, a time interval started when the protection circuit 166 enables the first switch circuit 162 until the control module 180 determines that the first switch circuit 162 is turned on is a determination delay time DDT (i.e., a time interval between the time T21 and the time T23 as depicted in FIG. 6), and a width of the pulse PLS generated by the one-shot circuit 166_41 is greater than the determination delay time DDT. Similarly, an operation method of one-shot circuit 166_41 is similar to the operating time sequence depicted in FIG. 6, such that the operating method may refer to related description for FIG. 6, which is not repeated hereinafter.

In an embodiment of the invention, the one-shot circuit 166_41 may be realized by using a common 555 timer, but the invention is not limited thereto. Herein, the 555 timer may be configured to be in a monostable mode. Detail regarding the one-shot circuit that is realized by using the 555 timer belongs to a technology well-known by persons skilled in the art, which is omitted hereinafter.

The over-loading protection circuits 166_2, 166_3 and 166_4 in the foregoing embodiments serve to illustrate rather than limit the scope of the invention. It should be understood that, persons skilled in the art may modify and retouch the over-loading protection circuits 166_2, 166_3 and 166_4 according to the timing sequence illustrated in FIG. 6 and related description thereof.

In an embodiment of the present invention, the switch module 160 and the control module 180 may also be integrated as one single module. However, the invention is not limited thereto.

In summary, the power transmission apparatus according to the embodiments of the invention is capable of detecting the load power of the power supply port, and switching between the first switch circuit and the second switch circuit in the switch module according to the detected load power of the power supply port. When the protection circuit detects that the load power is greater than the predetermined over-loading threshold, the protection circuit may generate the first control signal to turn on the first switch circuit to reduce the current that flow through the second switch circuit so as to perform the over-loading protection for the second switch circuit. After the control module determines that the first switch circuit is turned on by the protection circuit according to the first control signal, the control module may control the first switch circuit to be kept at the on-state and generate the second control signal to disable the second switch circuit and the protection circuit. As a result, the risk for damaging the second switch circuit due to over-loading may be significantly reduced.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A power transmission apparatus with over-loading protection and power-saving mechanism, comprising:
    a switch module, comprising:
        a first switch circuit, coupled between a power input module and a power supply port to receive an AC power provided by a city power system from the power input module, and controlled by a first control signal to transmit the AC power to the power supply port;
        a second switch circuit, coupled to the power input module to receive the AC power; and
        a protection circuit, coupled between the second switch circuit and the power supply port,
        wherein the second switch circuit is controlled by a second control signal to transmit the AC power to the power supply port through the protection circuit,
        wherein the protection circuit is controlled by the second control signal to detect a load power of the power supply port when the second switch circuit is turned on, and the protection circuit generates the first control signal to enable the first switch circuit when an instantaneous variation of the load power is greater than a predetermined over-loading threshold so as to protect the second switch circuit at an on-state.

2. The power transmission apparatus according to claim 1, further comprising:
    a control module, coupled to the first switch circuit, the second switch circuit, and the protection circuit to control on/off states of the first switch circuit, the second switch circuit, and the protection circuit and receive the first control signal,
    wherein when the control module determines that the first switch circuit is turned on according to the first control signal, the control module controls the first switch circuit to be kept at the on-state, and the control module generates the second control signal to disable the second switch circuit and the protection circuit.

3. The power transmission apparatus according to claim 2, further comprising:
    a detection module, coupled between another terminal of the power input module and another terminal of the power supply port to detect the load power of the power supply port,
    wherein the control module is coupled to the detection module to receive the load power, and controls the on/off states of the first switch circuit, the second switch circuit, and the protection circuit according to the load power detected by the detection module.

4. The power transmission apparatus according to claim 3, wherein
    when the first switch circuit is turned on, the second switch circuit is not turned on, and the load power detected by the detection module is continuously less than a power-saving threshold for a predetermined time, the control module enables the second switch circuit and the protection circuit and disables the first switch circuit,
    wherein the power-saving threshold is less than the predetermined over-loading threshold.

5. The power transmission apparatus according to claim 4, wherein
    when the second switch circuit is turned on, the first switch circuit is not turned on, and the load power detected by the detection module is continuously greater than the power-saving threshold and less than the predetermined over-loading threshold for a predetermined time, the control module enables the first switch circuit and disables the second switch circuit and the protection circuit.

6. The power transmission apparatus according to claim 2, wherein the protection circuit comprises:
    a sensing circuit, coupled between the second switch circuit and the power supply port to detect the load power of the power supply port, and generating a trigger signal; and
    an over-loading protection circuit, coupled to the sensing circuit to receive the trigger signal, and generating the first control signal in response to the trigger signal when the second switch circuit is turned on.

7. The power transmission apparatus according to claim 6, wherein the sensing circuit comprises:
    a resistor, coupled between the second switch circuit and the power supply port; and
    an optical coupler, coupled to two terminals of the resistor, and generating the trigger signal in response to a voltage difference between the two terminals of the resistor.

8. The power transmission apparatus according to claim 6, wherein the over-loading protection circuit comprises:
    an NAND gate, having a first input terminal coupled to the sensing circuit to receive the trigger signal;
    a D flip-flop, having a reset terminal coupled to the control module to receive the second control signal, an inverted data output terminal coupled to a data input terminal of the D flip-flop and coupled to a second input terminal of the NAND gate, and a clock input terminal coupled to an output terminal of the NAND gate; and a transistor, having a control terminal coupled to a non-inverted data output terminal of the D flip-flop, a first terminal coupled to a ground terminal, and a second terminal configured to output the first control signal.

9. The power transmission apparatus according to claim 6, wherein the over-loading protection circuit comprises:

a processor, coupled to the sensing circuit to receive the trigger signal, coupled to the control module to receive the second control signal, and accordingly generating a switch signal; and a transistor, having a control terminal coupled to the processor to receive the switch signal, a first terminal coupled to a ground terminal, and a second terminal configured to output the first control signal, wherein the processor controls an on/off state of the transistor in response to the trigger signal when the processor determines that the second switch circuit is turned on according to the second control signal, wherein the processor turns off the transistor when the processor determines that the second switch circuit is not turned on according to the second control signal.

10. The power transmission apparatus according to claim 6, wherein the over-loading protection circuit comprises:

a one-shot circuit, coupled to the sensing circuit to receive the trigger signal, and coupled to the control module to receive the second control signal, wherein the one-shot circuit generates a pulse in response to the second control signal and the trigger signal, and outputs the pulse to serve as the first control signal, wherein a time interval started when the protection circuit enables the first switch circuit until the control module determines that the first switch is turned on is a determination delay time, and a width of the pulse generated by the one-shot circuit is greater than the determination delay time.

11. The power transmission apparatus according to claim 1, wherein the first switch circuit comprises an electromagnetic relay, and the second switch circuit comprises a solid state relay.

* * * * *